(12) United States Patent
Jang

(10) Patent No.: US 11,500,563 B2
(45) Date of Patent: Nov. 15, 2022

(54) MEMORY SYSTEM AND OPERATING METHOD FOR TESTING TARGET FIRMWARE BY PROCESSING A PLURALITY OF TEST COMMANDS

(71) Applicant: SK hynix Inc., Icheon (KR)

(72) Inventor: In Jong Jang, Icheon (KR)

(73) Assignee: SK hynix Inc., Icheon (KR)

( * ) Notice: Subject to any disclaimer, the term of this patent is extended or adjusted under 35 U.S.C. 154(b) by 53 days.

(21) Appl. No.: 17/151,551

(22) Filed: Jan. 18, 2021

(65) Prior Publication Data

US 2022/0075543 A1 Mar. 10, 2022

(30) Foreign Application Priority Data

Sep. 7, 2020 (KR) .......................... 10-2020-0113846

(51) Int. Cl.
*G06F 3/06* (2006.01)

(52) U.S. Cl.
CPC .......... *G06F 3/0638* (2013.01); *G06F 3/0604* (2013.01); *G06F 3/0659* (2013.01); *G06F 3/0679* (2013.01)

(58) Field of Classification Search
CPC .... G06F 3/0638; G06F 3/0604; G06F 3/0659; G06F 3/0679; G06F 11/3696; G06F 11/3688; G06F 3/0614; G06F 3/0673; G06F 3/0653; G11C 29/18; G11C 29/36
See application file for complete search history.

(56) References Cited

U.S. PATENT DOCUMENTS

| | | | | |
|---|---|---|---|---|
| 6,463,552 | B1 * | 10/2002 | Jibbe | G06F 9/45512 714/33 |
| 2013/0326295 | A1 * | 12/2013 | Jeon | G11C 29/36 714/719 |
| 2015/0248246 | A1 * | 9/2015 | Take | G06F 3/0616 711/103 |
| 2017/0262179 | A1 * | 9/2017 | Suizu | G06F 13/16 |
| 2018/0203758 | A1 * | 7/2018 | Kannan | G06F 11/108 |
| 2019/0179543 | A1 * | 6/2019 | Sharon | G11C 16/3427 |
| 2019/0317697 | A1 * | 10/2019 | La Fratta | G06F 12/0246 |
| 2020/0250334 | A1 * | 8/2020 | Bandi | G06F 12/0246 |
| 2021/0034355 | A1 * | 2/2021 | Montero | G06F 3/0652 |
| 2021/0311887 | A1 * | 10/2021 | Hieb | G06F 1/189 |

FOREIGN PATENT DOCUMENTS

| | | |
|---|---|---|
| KR | 20100050380 A | 5/2010 |
| KR | 20150048136 A | 5/2015 |
| KR | 20180054432 A | 5/2018 |
| WO | WO2014035908 A1 | 3/2014 |

* cited by examiner

*Primary Examiner* — Nanci N Wong
*Assistant Examiner* — Tong B. Vo

(57) ABSTRACT

Embodiments of the present disclosure relate to a memory system and an operating method thereof. According to the embodiments of the present disclosure, the memory system may, when setting a firmware as a target firmware, generate a plurality of test commands to test the target firmware, test the target firmware by processing the plurality of test commands, and randomly generate logical block address (LBA) values corresponding to each of the plurality of test commands based on a seed value corresponding to each of the plurality of test commands.

12 Claims, 14 Drawing Sheets

MEMORY SYSTEM AND OPERATING METHOD FOR TESTING TARGET FIRMWARE BY PROCESSING A PLURALITY OF TEST COMMANDS

CROSS-REFERENCE TO RELATED APPLICATION

The present application claims priority to Korean Patent Application No. 10-2020-0113846 filed in the Korean Intellectual Property Office on Sep. 7, 2020, which is incorporated herein by reference in its entirety.

BACKGROUND

1. Technical Field

The embodiments generally relate to a memory system and an operating method thereof.

2. Related Art

A memory system, e.g., a storage device, stores data based on a request received from a host, such as a computer, a mobile terminal (for example, a smartphone or a tablet), or any of various other electronic devices. The memory system may be a type of device that stores data in a magnetic disk, such as a hard disk drive (HDD), or a type of device that stores data in a nonvolatile memory, such as a solid state drive (SSD), a universal flash storage device (UFS), and/or an embedded MMC (eMMC) device.

The memory system may further include a memory controller for controlling the memory device. The memory controller may receive a command from the host and, based on the received command, may execute or control operations for reading, writing, and/or erasing data in a volatile memory or a nonvolatile memory included in the memory system. The memory controller may drive firmware for performing a logical operation that controls such operations.

The memory system, before driving the firmware, may perform a test on or with respect to the firmware to determine whether an error exists in the firmware and/or whether a circuit defect exists in the memory system. Conventionally, in order to minimize the resources used for testing the firmware, and to perform the test efficiently, firmware is tested in an environment similar to the user environment in which the memory system actually receives and processes commands received from the host.

SUMMARY

Embodiments of the disclosure may provide a memory system and an operating method thereof capable of quickly detecting whether an error exists in firmware and notifying the user.

In addition, embodiments of the present disclosure may provide a memory system and an operating method thereof capable of reducing the cost required for testing firmware.

In one aspect, embodiments of the disclosure may provide a memory system including a memory device and a memory controller for communicating with the memory device and executing a firmware to control the memory device.

When the firmware is set to a target firmware, the memory controller may generate a plurality of test commands to test the target firmware.

The memory controller may test the target firmware by processing the plurality of test commands.

In this case, the memory controller may randomly generate a logical block address value corresponding to each of the plurality of test commands based on a seed value corresponding to each of the plurality of test commands.

The memory controller may randomly generate a logical block address value corresponding to the first generated test command among the plurality of test commands based on a target clock.

As an example, the memory controller may randomly generate a logical block address value corresponding to a test command generated as an Nth test command (N is a natural number of 2 or more) among the plurality of test commands based on the target clock.

As another example, the memory controller may randomly generate a logical block address value corresponding to a test command generated as an Nth test command (N is a natural number of 2 or more) among the plurality of test commands based on a value of a watchdog timer at a time when the (N−1)th test command generated among the plurality of test commands is generated.

The memory controller may determine a priority of processing the plurality of test commands based on a priority policy corresponding to the target firmware.

In another aspect, embodiments of the disclosure may provide a method of operating a memory system including a memory device with a plurality of memory blocks.

The method of operating the memory system may include generating, when the firmware for controlling the memory device is set as the target firmware, a plurality of test commands to test the target firmware.

The method of operating the memory system may include testing the target firmware by processing the plurality of test commands.

In this case, a logical block address value corresponding to each of the plurality of test commands may be randomly generated based on a seed value corresponding to each of the plurality of test commands.

A logical block address value corresponding to the first generated test command among the plurality of test commands may be randomly generated based on a target clock.

In an example, a logical block address value corresponding to a test command generated as an Nth test command (N is a natural number of 2 or more) among the plurality of test commands may be randomly generated based on the target clock.

In another example, a logical block address value corresponding to a test command generated as an Nth test command (N is a natural number of 2 or more) among the plurality of test commands may be randomly generated based on a value of a watchdog timer at the time when the (N−1)th test command generated among the plurality of test commands is generated.

The priority of processing the plurality of test commands may be determined based on a priority policy corresponding to the target firmware.

According to the embodiments of the disclosure, it is possible to quickly detect whether an error exists in firmware and notifying the user.

Furthermore, according to the embodiments of the disclosure, it is possible to reduce the cost required for testing firmware.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
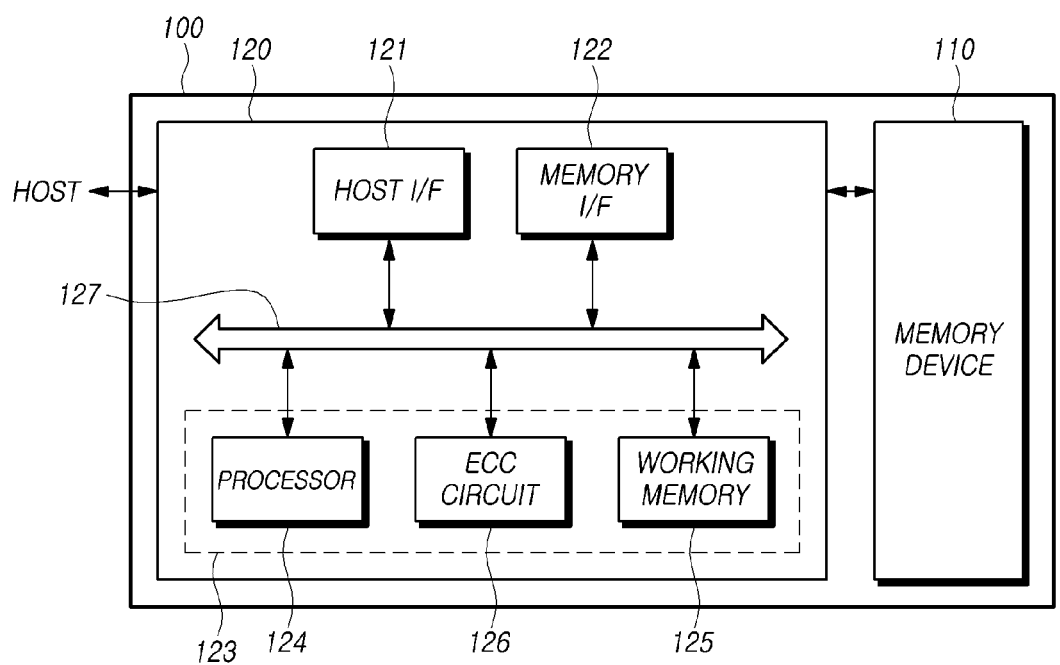
FIG. 1 is a schematic diagram that illustrates a configuration of a memory system according to an embodiment of the present disclosure.

FIG. 1 is a diagram that illustrates the schematic configuration of a memory system 100 according to an embodiment of the present disclosure.

Referring to FIG. 1, the memory system 100 may include a memory device 110 configured to store data, and a memory controller 120 configured to control the memory device 110.

The memory device 110 may include multiple memory blocks. The memory device 110 may be configured to operate in response to control signals received from the memory controller 120. Operations of the memory device 110 may include, for example, a read operation, a program operation (also referred to as a "write operation"), an erasure operation, and the like.

The memory device 110 may include a memory cell array that includes multiple memory cells (also referred to as "cells") configured to store data. The memory cell array may exist inside a memory block.

For example, the memory device 110 may be implemented as any of various types of memories, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), and/or a spin transfer torque random access memory (STT-RAM).

The memory device 110 may be implemented in a three-dimensional array structure. Embodiments of the present disclosure are applicable not only to a flash memory device having an electric charge storage layer configured as a conductive floating gate, but also to a flash memory device having a charge trap flash (CTF) with an electric charge storage layer configured as an insulating film.

The memory device 110 may be configured to receive a command and an address from the memory controller 120, and to access an area of the memory cell array selected using the address. That is, the memory device 110 may perform an operation corresponding to the received command in a memory area of the memory device having a physical address corresponding to the received address from the controller.

For example, the memory device 110 may perform a program operation, a read operation, an erase operation, and the like. During the program operation, the memory device 110 may program data in the area selected by the address. During the read operation, the memory device 110 may read data from the area selected by the address. During the erase operation, the memory device 110 may erase data stored in the area selected by the address.

The memory controller 120 may control write (or program), read, erase, and/or background operations with respect to the memory device 110. The background operation may be, for example, a garbage collection (GC) operation, a wear leveling (WL) operation, and/or a bad block management (BBM) operation.

The memory controller 120 may control the operation of the memory device 110 at the request of a host. Alternatively, the memory controller 120 may control the operation of the memory device 110 without a corresponding request of the host, such as, for example, when it performs one or more background operations of the memory device.

The memory controller 120 and the host may be separate devices. In another embodiment, the memory controller 120 and the host may be integrated and implemented as a single device. In the following description, the memory controller 120 and the host are separate devices.

The memory controller 120 may include a host interface (I/F) 121, a memory interface 122, and a control circuit 123.

The host interface 121 may be configured to provide an interface for communication with the host.

When receiving a command from the host (HOST), the control circuit 123 may receive the command through the host interface 121, and may perform an operation of processing the received command.

The memory interface 122 may be connected to the memory device 110 to provide an interface for communication with the memory device 110. That is, the memory interface 122 may be configured to provide the memory device 110 and the memory controller 120 with an interface in response to control of the control circuit 123.

The control circuit 123 may be configured to control the operation of the memory device 110 by performing operations for overall control of the memory controller 120. To perform the operations, the control circuit 123 may include a processor 124 and a working memory 125. The control circuit 123 may further include an error detection and correction (detection/correction) circuit (e.g., ECC circuit) 126.

The processor 124 may control overall operation of the memory controller 120. The processor 124 may perform a logical operation. The processor 124 may communicate with the host through the host interface 121. The processor 124 may communicate with the memory device 110 through the memory interface 122.

The processor 124 may perform a function of a flash translation layer (FTL). The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, according to the mapping unit. Typical address mapping methods include a page mapping method, a block mapping method, and/or a hybrid mapping method.

The processor 124 may be configured to randomize data received from the host. For example, the processor 124 may randomize data received from the host by using a randomizing seed. The randomized data is provided to the memory device 110 as data to be stored and is programmed in the memory cell array.

The processor 124 may be configured to derandomize data received from the memory device 110 during a read operation. For example, the processor 124 may derandomize data received from the memory device 110 by using a derandomizing seed. The derandomized data may be output to the host.

The processor 124 may execute firmware (FW) to control the operation of the memory controller 120. In other words, the processor 124 may control overall operations of the memory controller 120 and, in order to perform a logical operation, may execute (or drive) firmware loaded into the working memory 125 during booting.

The firmware refers to a program executed inside the memory system 100 and may include various functional layers.

For example, the firmware may include a flash translation layer (FTL), a host interface layer (HIL) and/or a flash interface layer (FIL). The flash translation layer is configured to translate between a logical address, which the host requests the memory system 100 to provide, and a physical address of the memory device 110. The host interface layer is configured to interpret a command that the host issues to the memory system 100 (or storage device) and to deliver the same to the FTL. The flash interface layer is configured to deliver a command issued by the FTL to the memory device 110.

For example, the firmware may be stored in the memory device 110, then loaded into the working memory 125.

The working memory 125 may store firmware, program codes, commands, or pieces of data to drive the memory controller 120. The working memory 125 may include, for example, a static RAM (SRAM), a dynamic RAM (DRAM), and/or a synchronous RAM (SDRAM) as a volatile memory.

The error detection/correction circuit 126 may be configured to detect error bit(s) of target data by using an error correction code, and to correct the detected error bit(s). For example, the target data may be data stored in the working memory 125, data retrieved from the memory device 110, or the like.

The error detection/correction circuit 126 may be implemented to decode data by using the error correction code. The error detection/correction circuit 126 may be implemented by using various code decoders. For example, a decoder that performs nonsystematic code decoding or a decoder that performs systematic code decoding may be used.

For example, the error detection/correction circuit 126 may detect error bit(s), sector by sector, with regard to each piece of read data. That is, each piece of read data may include multiple sectors. As used herein, a sector may refer to a data unit smaller than the read unit (e.g., page) of a flash memory. Sectors constituting each piece of read data may correspond to each other via an address.

The error detection/correction circuit 126 may calculate a bit error rate (BER) and determine whether or not correction can be made sector by sector. For example, if the BER is higher than a reference value, the error detection/correction circuit 126 may determine that the corresponding sector is uncorrectable or "a fail." If the BER is lower than or equal to the reference value, the error detection/correction circuit 126 may determine that the corresponding sector is correctable or "a pass."

The error detection/correction circuit 126 may perform error detection and correction operations successively with regard to all pieces of read data. When a sector in the read data is correctable, the error detection/correction circuit 126 may omit the error detection and correction operations related to the corresponding sector with regard to the next piece of read data. After finishing error detection and correction operations with regard to all pieces of read data in this manner, the error detection/correction circuit 126 may detect a sector deemed uncorrectable to the end. There may be one or more sectors deemed uncorrectable. The error detection/correction circuit 126 may deliver information (for example, address information) regarding the sectors deemed uncorrectable to the processor 124.

The bus 127 may be configured to provide a channel between the constituent elements 121, 122, 124, 125, and/or 126 of the memory controller 120. The bus 127 may include, for example, a control bus for delivering various types of control signals and commands, and a data bus for delivering various types of data.

The above-mentioned constituent elements 121, 122, 124, 125, and/or 126 of the memory controller 120 are only provided as examples. One or more of the above-mentioned constituent elements may be omitted from the memory controller 120, and/or one or more of the above-mentioned constituent elements may be integrated into a single element. In addition, in some cases, one or more other constituent elements may be added, in addition to the above-mentioned constituent elements of the memory controller 120.

Hereinafter, the memory device 110 is described in more detail with reference to FIG. 2.

Figure 2:
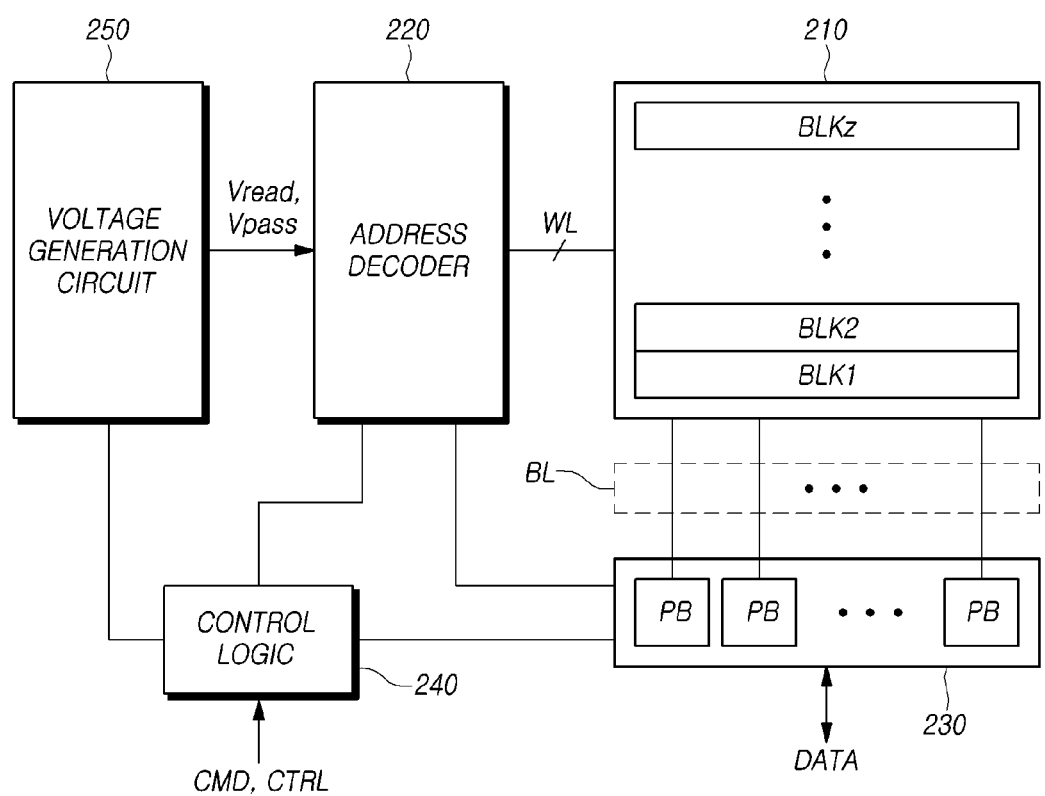
FIG. 2 is a block diagram that illustrates a memory device according to an embodiment of the present disclosure.

FIG. 2 is a block diagram that illustrates a memory device 110 according to an embodiment of the present disclosure.

Referring to FIG. 2, the memory device 110 may include a memory cell array 210, an address decoder 220, a read and write (read/write) circuit 230, control logic 240, and a voltage generation circuit 250.

The memory cell array 210 may include multiple memory blocks BLK1-BLKz, where z is a natural number greater than or equal to 2.

In the multiple memory blocks BLK1-BLKz, multiple word lines WL and multiple bit lines BL may be disposed, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells, and may include nonvolatile memory cells having a vertical channel structure.

The memory cell array 210 may be configured as a memory cell array having a two-dimensional structure and, in some cases, may be configured as a memory cell array having a three-dimensional structure.

Each of the multiple memory cells in the memory cell array 210 may store at least one bit of data. For example, each of the multiple memory cells in the memory cell array 210 may be a single-level cell (SLC) configured to store one bit of data, a multi-level cell (MLC) configured to store two bits of data, a triple-level cell (TLC) configured to store three bits of data, or a quad-level cell (QLC) configured to store four bits of data. As another example, the memory cell array 210 may include multiple memory cells, each of which may be configured to store five or more bits of data.

The address decoder 220, the read/write circuit 230, the control logic 240, and the voltage generation circuit 250 may operate as a peripheral circuit configured to drive the memory cell array 210.

The address decoder 220 may be connected to the memory cell array 210 through the multiple word lines WL.

The address decoder 220 may be configured to operate in response to control of the control logic 240.

The address decoder 220 may receive addresses through an input/output buffer inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

During a read operation, the address decoder 220 may apply the read voltage Vread to a selected word line WL inside a selected memory block and may apply the pass voltage Vpass to the remaining non-selected word lines WL.

During a program verification operation, the address decoder 220 may apply a verification voltage generated by the voltage generation circuit 250 to a selected word line WL inside a selected memory block and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and/or a column address.

The address decoder 220 may select one memory block and one word line according to the block address and the row address. The column address may be decoded by the address decoder 220 and provided to the read/write circuit 230.

The address decoder 220 may include a block decoder, a row decoder, a column decoder, and/or an address buffer.

The read/write circuit 230 may include multiple page buffers PB. The read/write circuit 230 may operate as a "read circuit" when the memory cell array 210 performs a read operation and may operate as a "write circuit" when the memory cell array 210 performs a write operation.

The above-mentioned read/write circuit 230 is also referred to as a page buffer circuit, which includes multiple page buffers PB, or a data register circuit. The read/write circuit 230 may include a data buffer that is used in a data processing function and, in some cases, may further include a cache buffer used in a caching function.

The multiple page buffers PB may be connected to the memory cell array 210 through the multiple bit lines BL. In order to sense the threshold voltage Vth of the memory cells during a read operation and a program verification operation, the multiple page buffers PB may continuously supply a sensing current to the bit lines BL connected to the memory cells, may sense, through a sensing node, a change in the amount of current that flows according to the program state of a corresponding memory cell, and may latch the same as sensing data.

The read/write circuit 230 may operate in response to page buffer control signals output from the control logic 240.

During a read operation, the read/write circuit 230 senses data in a memory cell, temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control overall operation of the memory device 110 in response to the control signal CTRL. The control logic 240 may output a control signal for adjusting the pre-charge potential level of sensing nodes of multiple page buffers PB.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK in the memory device 110 may include multiple pages PG and multiple strings. The multiple pages PG correspond to multiple word lines WL, and the multiple strings STR correspond to multiple bit lines BL.

In the memory block BLK, multiple word lines WL and multiple bit lines BL may be arranged to intersect one another. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other, thereby defining multiple memory cells MC. Each memory cell MC may have a transistor TR arranged therein.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line.

A read operation and a program operation (e.g., write operation) of the memory block may be performed page by page, and an erase operation may be performed memory block by memory block.

Figure 3:
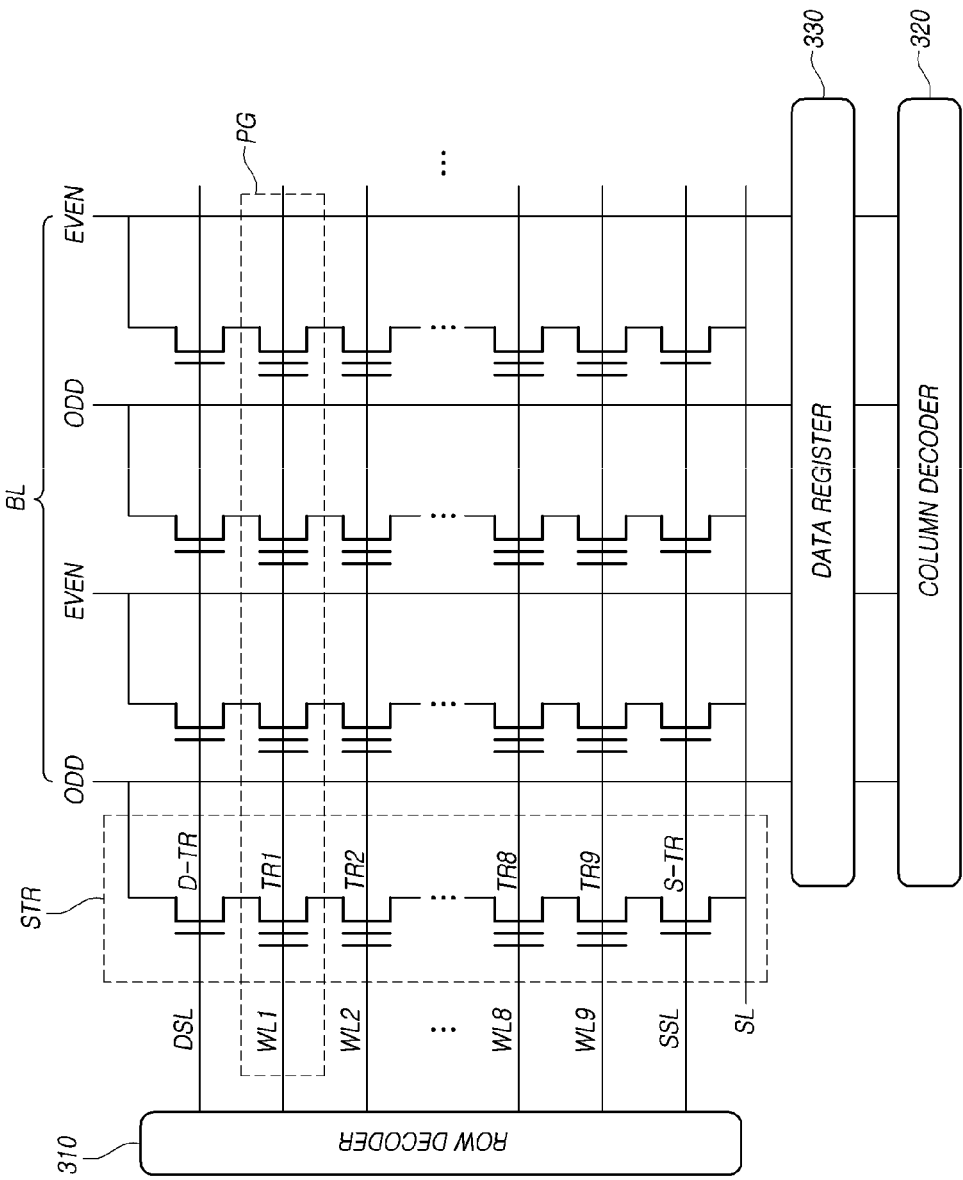
FIG. 3 is a diagram that illustrates a structure of word lines and bit lines of a memory device according to an embodiment of the present disclosure.

FIG. 3 is a diagram that illustrates a structure of word lines WL and bit lines BL of a memory device 110 according to an embodiment of the present disclosure.

Referring to FIG. 3, the memory device 110 has a core area in which memory cells MC are concentrated, and an auxiliary area which corresponds to the remaining non-core area. The auxiliary area supports the operations of the memory cell array 210.

The core area may include pages PG and strings STR. In the core area, multiple word lines WL1-WL9 and multiple bit lines BL are arranged to intersect.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to a single page PG, as illustrated in FIG. 3. When each of the multiple word lines WL1-WL9 has a large size, each of the multiple word lines WL1-WL9 may correspond to at least two (for example, two or four) pages PG. Each page PG is the smallest unit in connection with conducting a program operation and a read operation, and all memory cells MC within the same page PG may perform simultaneous operations when conducting a program operation and a read operation.

The multiple bit lines BL may be connected to the column decoder 320 while being distinguished between odd-numbered bit lines BL and even-numbered bit lines BL.

For accessing a memory cell MC, the address may be entered to the core area first through the input/output and then through the row decoder 310 and the column decoder 320, such that a corresponding target memory cell can be designated. As used herein, designating a target memory cell refers to accessing one of the memory cells MC at the sites of intersection between the word lines WL1-WL9 connected to the row decoder 310 and the bit lines BL connected to the column decoder 320, for programming data therein or for reading programmed data therefrom.

Pages PG in a first direction (for example, a horizontal direction as seen in FIG. 3) are bound by a commonly used line, referred to as a word line WL, and strings STR in a second direction (for example, vertical direction as seen in FIG. 3) are bound (e.g., connected) by a common line, referred to as a bit line BL. As used herein, being commonly bound refers to being structurally connected by the same material and simultaneously receiving the same voltage during voltage application. The voltage applied to a memory cell MC further down the line among memory cells MC connected in series may slightly differ from the voltage applied to a memory cell MC further up line, due to the voltage drop across the preceding memory cell(s) MC.

The data register 330 plays an important role because all data processing by the memory device 110, including program and read operations, occurs via the data register 330. If data processing by the data register 330 is delayed, all of the other areas wait until the data register 330 finishes the data processing. In addition, degradation of performance of the data register 330 may degrade overall performance of the memory device 110.

In the example illustrated in FIG. 3, in one string STR, multiple transistors TR1-TR9 may be connected to multiple word lines WL1-WL9, respectively. The multiple transistors TR1-TR9 correspond to memory cells MC. In this example, each of the multiple transistors TR1-TR9 include a control gate CG and a floating gate FG.

The multiple word lines WL1-WL9 include two outermost word lines WL1 and WL9. A first selection line DSL may be additionally arranged outside the first outermost word line WL1, which is closer to the data register 330 in terms of the signal path among the two outermost word lines WL1 and WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR plays the role of a switch that turns on or off the connection between the corresponding string STR and the data register 330. The second selection transistor S-TR plays the role of a switch that turns on or off the connection between the corresponding string STR and the source line SL. That is, the first selection transistor D-TR and the second selection transistor S-TR play the role of gatekeepers that are positioned at opposite ends of the corresponding string STR to deliver or block signals.

During a program operation, the memory system 100 fills the target memory cell MC of the bit line BL, which is to be programmed with electrons. Accordingly, the memory system 100 applies a turn-on voltage Vcc to the gate electrode of the first selection transistor D-TR, thereby turning on the first selection transistor D-TR, and applies a turn-off voltage (for example, 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may supply a voltage (for example, +20V) to the substrate through a source line SL during an erase operation. The memory system 100 floats both the first selection transistor D-TR and the second selection transistor S-TR during an erase operation, thereby generating an infinite resistance. As a result, the role of the first selection transistor D-TR and that of the second selection transistor S-TR may be removed, and electrons may operate or move only between the floating gate FG and the substrate due to the potential difference.

Figure 4:
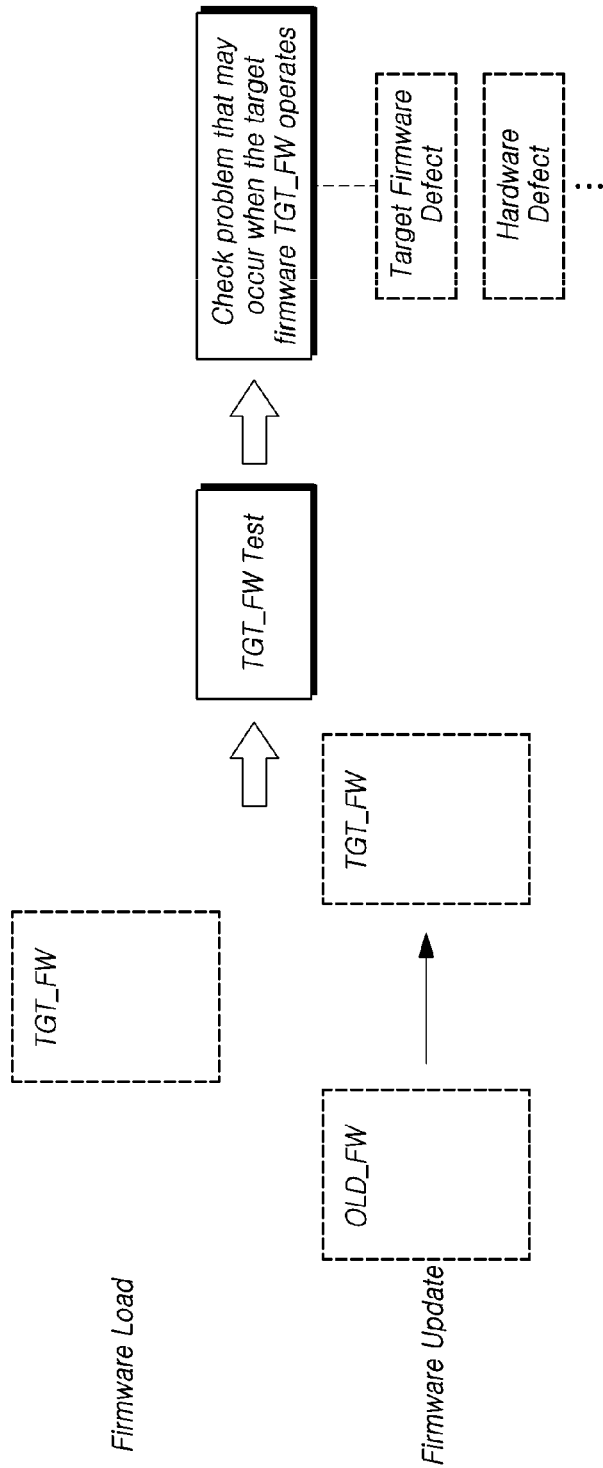
FIG. 4 is a diagram that illustrates the timing at which the memory system tests the target firmware according to an embodiment of the present disclosure

FIG. 4 is a diagram that illustrates the timing at which the memory system 100 tests the target firmware TGT_FW according to embodiments of the present disclosure.

Referring to FIG. 4, the memory controller 120 of the memory system 100 may test the target firmware TGT_FW when a firmware is set as the target firmware TGT_FW. After the firmware is set as the target firmware TGT_FW, in order to check in advance of a problem that may occur when the target firmware TGT_FW operates, the memory controller 120 may test the target firmware TGT_FW before the operation of the target firmware TGT_FW.

In this case, the problem that may occur when the target firmware TGT_FW operates may be, for example, a defect or an existing error in the target firmware TGT_FW.

As another example, the problem that may occur when running the target firmware TGT_FW may be a defect of a circuit (e.g., memory interface 122) used to transmit and receive data between the memory controller 120 and the memory device 110. If there is a hardware defect in the circuit, an error may occur in the process of transmitting and receiving data between the memory controller 120 and the memory device 110 when testing the target firmware TGT_FW. Accordingly, the memory controller 120 can check whether a hardware defect exists in the circuit by checking whether such an error occurs during the testing of the target firmware TGT_FW.

An example of an instance when the firmware is set to the target firmware TGT_FW is described as follows.

For example, when the target firmware TGT_FW is initially loaded into the memory controller 120, the memory controller 120 may test the loaded target firmware TGT_FW.

As another example, the memory controller 120 may test the updated target firmware TGT_FW when the firmware update occurs, that is, when the firmware is updated from the previously set old firmware OLD_FW to the target firmware TGT_FW.

In particular, the target firmware TGT_FW may be loaded, or the previously installed firmware may be updated to the target firmware TGT_FW during the process of manufacturing the memory system 100. In this case, since the target firmware TGT_FW may be immediately tested during the manufacturing process of the memory system 100, a turn-around time (TAT) of the memory system 100 may be reduced. Furthermore, a defect existing in the memory system 100 may be detected in advance and before a user uses the memory system 100.

Hereinafter, the operation of the memory system 100 testing the target firmware TGT_FW will be described in detail.

Figure 5:
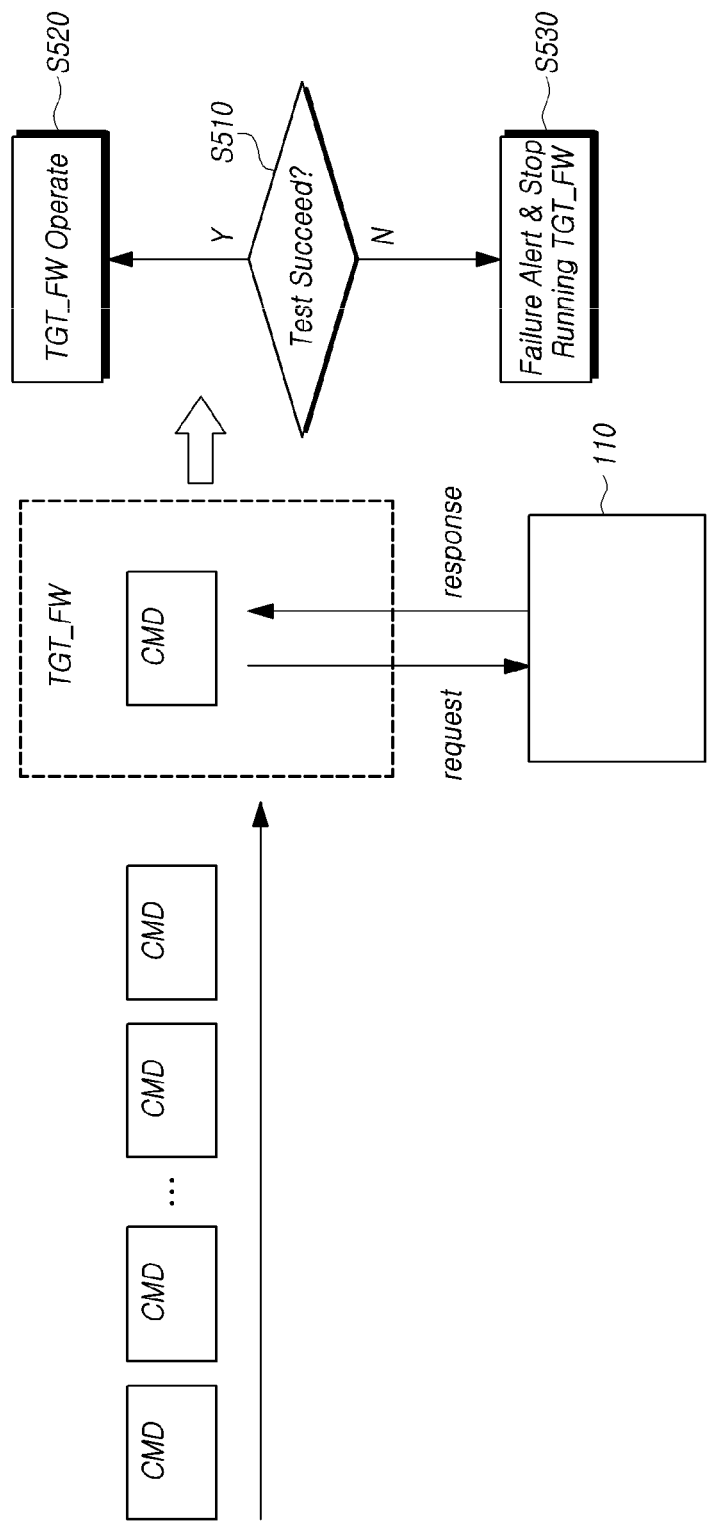
FIG. 5 is a diagram that illustrates the operation of testing the target firmware by the memory system according to embodiments of the present disclosure.

FIG. 5 is a diagram that illustrates the operation of testing the target firmware TFT_FW by the memory system 100 according to embodiments of the present disclosure.

Referring to FIG. 5, the memory controller 120 of the memory system 100 may generate a plurality of test commands CMD to test the target firmware TGT_FW. That is, the memory controller 120 may test the target firmware TGT_FW by generating the plurality of test commands CMD, instead of testing the target firmware TGT_FW using a command generated by a host or an external device. Therefore, the memory system 100 may reduce costs that may occur by using the host or an external device to test the target firmware TGT_FW.

In particular, although the external device used to test the target firmware TGT_FW can test data, functions, and the memory device 110 inside the memory system 100, this external device is relatively expensive. Therefore, if the memory system 100 performs the test for the target firmware TGT_FW without using such an external device, the cost reduction can be further increased or enhanced.

The memory controller 120 may test the target firmware TGT_FW by processing the generated test commands CMD after generating the plurality of test commands CMD. The memory controller 120 may process the plurality of test commands CMD one by one in a sequence, or may process one or more of the plurality of test commands CMD in parallel.

Meanwhile, the memory controller 120 may not synchronize the execution order of all the test commands CMD in the process of processing the plurality of test commands CMD. That is, the memory controller 120 may process the plurality of test commands CMD one by one, but instead of processing the next test command after processing for a specific test command is completed, the memory controller 120 may asynchronously process one or more of the plurality of test commands CMD.

The memory controller 120 may execute one of the plurality of test commands CMD based on the target firmware TGT_FW. The memory controller 120 may transmit a request to the memory device 110 according to an operation defined in an executed test command and receive a response to the request from the memory device 110. The memory controller 120 may determine whether the test for a corresponding test command succeeds or fails based on the response from the memory device 110. For example, if the response of the memory device 110 to the corresponding test command indicates success, the memory controller 120 may determine that the test for the corresponding test command has succeeded, and if the response of the memory device 110 indicates failure, the memory controller 120 may determine that the test for the corresponding test command has failed.

The memory controller 120 may execute each of the plurality of test commands CMD based on the target firmware TGT_FW, and then may determine whether the test for the target firmware TGT_FW has succeeded based on an execution result of each of the plurality of test commands CMD (S510).

As an example, the memory controller 120 may determine that the test for the target firmware TGT_FW has succeeded when, among the plurality of test commands CMD, the tests for the test commands equal to or greater than a specific threshold value (e.g., 50) are successful. On the other hand, the memory controller 120 may determine that the test for the target firmware TGT_FW has failed when, among the plurality of test commands CMD, the tests for the test commands less than the specific threshold value are successful.

The memory controller 120 may run or drive the target firmware TGT_FW (S520) in the case that it is determined that the test for the target firmware TGT_FW has succeeded (S510—Y).

Meanwhile, if the memory controller 120 determines that the test for the target firmware TGT_FW has failed (S510—N), the memory system 100 may output or transmit an alert, indicating that a failure has occurred while testing the target firmware TGT_FW, outside of the memory system 100, and may stop running the target firmware TGT_FW (S530). Therefore, the memory controller 120 may prevent a problem caused by running the target firmware TGT_FW in advance.

For example, the alert may be transmitted or delivered to the host in the form of a specific signal or message. In addition, the memory controller 120 may enter a stuck state after stopping the running of the target firmware TGT_FW, or may operate other firmware (e.g., firmware of a previous version or a preset default firmware) instead of the target firmware TGT_FW.

As described herein, when the memory controller 120 tests the target firmware TGT_FW, the memory controller 120 may generate the plurality of test commands CMD so that the test can be performed in an environment similar to the user environment, in order to emulate the user environment during testing as accurately as possible.

Hereinafter, a detailed operation of generating the plurality of commands CMD so that the memory controller 120 can perform the test in an environment similar to the user environment will be described.

Figure 6:
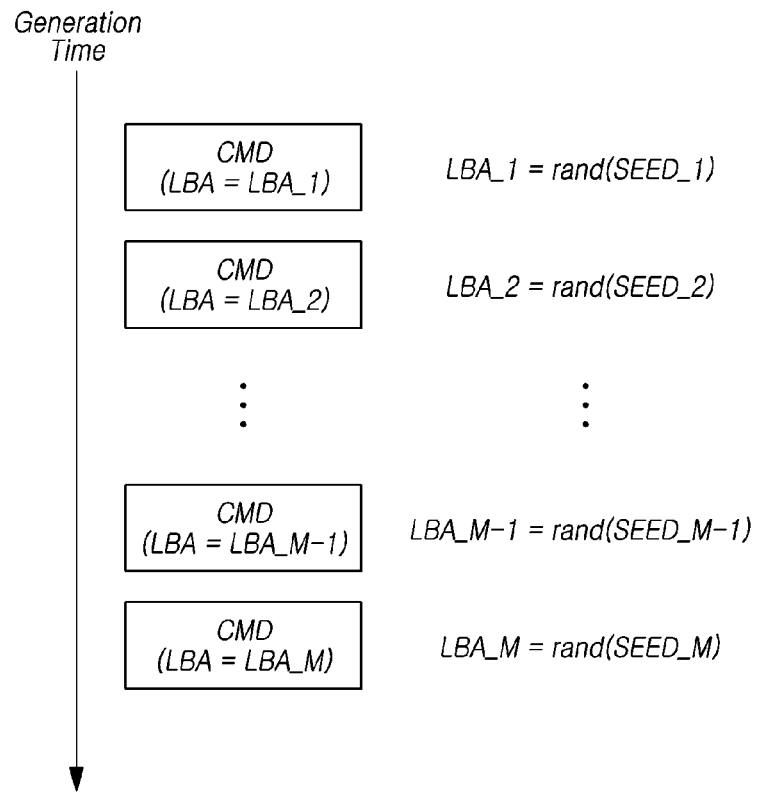
FIG. 6 is a diagram that illustrates an example of an operation of determining a logical block address corresponding to each of test commands by the memory system according to embodiments of the present disclosure.

FIG. 6 is a diagram that illustrates an example of an operation of determining a logical block address corresponding to each of test commands CMD by the memory system 100 according to embodiments of the present disclosure.

Referring to FIG. 6, the memory controller 120 of the memory system 100 may randomly generate a value of a logical block address corresponding to each of the plurality of test commands CMD based on a seed value corresponding to each test command. In an actual user environment, the commands transmitted from the host to the memory system 100 may have a random pattern. Accordingly, in order to set the characteristics of the plurality of test commands CMD to be as similar as possible to an actual user environment, the memory controller 120 may also randomly generate the logical block address value of each test command.

As illustrated in FIG. 6, the memory controller 120 may generate M test commands CMD (where M is a natural number greater than or equal to 2).

In this case, the memory controller 120 may randomly generate a first logical address LBA_1, which is a logical address corresponding to the first generated test command among the M test commands CMD, based on a first seed SEED_1, which is a seed corresponding to the corresponding command.

Furthermore, the memory controller 120 may randomly generate a second logical address LBA_2, which is a logical address corresponding to the second generated test command among the M test commands CMD, based on a second seed SEED_2, which is a seed corresponding to the corresponding command.

In a similar manner as described above, the memory controller 120 may randomly generate a (M−1)th logical address LBA_M−1, which is a logical address corresponding to the (M−1)th test command generated among the M test commands CMD, based on a (M−1)th seed SEED_M−1, which is a seed corresponding to the corresponding command. In addition, the memory controller 120 may randomly generate a Mth logical address LBA_M, which is a logical address corresponding to the Mth test command generated among the M test commands CMD, based on a Mth seed SEED_M, which is a seed corresponding to the corresponding command.

Hereinafter, a detailed method of randomly generating the logical block address corresponding to each of the plurality of test commands CMD by the memory system 100 will be described.

Figure 7:
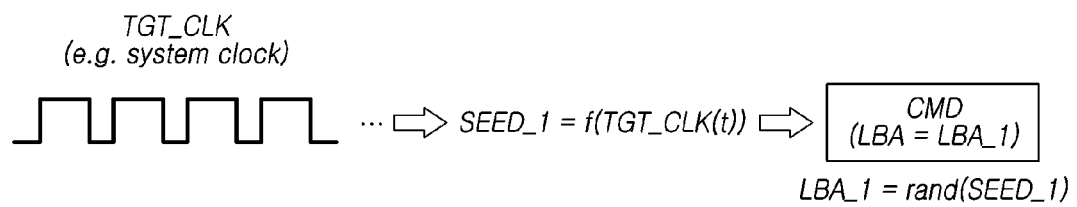
FIG. 7 is a diagram that illustrates an example of an operation in which the memory system generates the logical block address value corresponding to the first test command generated among the test commands of FIG. 6.

FIG. 7 is a diagram that illustrates an example of an operation in which the memory system 100 generates the logical block address value corresponding to the first test command generated among the test commands CMD of FIG. 6.

Referring to FIG. 7, the memory controller 120 of the memory system 100 may randomly generate a logical block address value corresponding to the first generated test command among the plurality of test commands CMD described in FIG. 6, based on the set target clock TGT_CLK.

That is, the memory controller 120 may set the first seed SEED_1, which is a seed value for generating the logical block address value corresponding to the first generated test command among the plurality of test commands CMD, as the value of the target clock (TGT_CLK) according to time t.

The target clock TGT_CLK may be, for example, a system clock used for the operation of the memory controller 120 or a clock used for synchronization during a data transmission/reception process with the memory device 110. However, the target clock TGT_CLK is not limited thereto and may be selected from among various clocks used internally by the memory system 100 or externally of the memory system 100.

As described herein, since the target clock value is not always constant, and varies slightly with time, the target clock may be used to randomly generate the logical block address value.

For example, assuming that the reference value of the target clock TGT_CLK is set to 100 MHz, the value of the target clock TGT_CLK may be not always 100 MHz, but may change, for example, like 100.001 MHz→99.998 MHz→100.003 MHz→99.999 MHz→ . . . according to a specific time. At the specific time, since the amount of change of the target clock TGT_CLK may be random compared to the reference value, the logical block address value can be randomly generated by using the target clock TGT_CLK.

Figure 8:
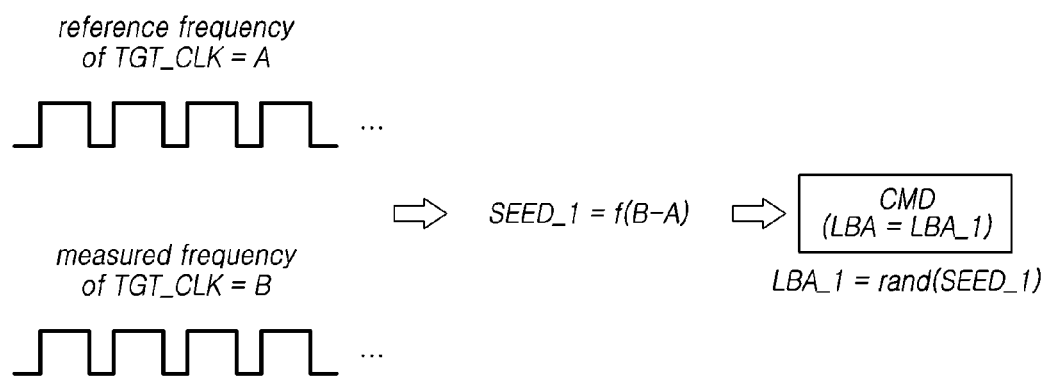
FIG. 8 is a diagram that illustrates an example of a method for generating a first seed value described in FIG. 7 by the memory system.

FIG. 8 is a diagram that illustrates an example of a method for generating the first seed value SEED_1 described in FIG. 7 by the memory system 100.

Referring to FIG. 8, it is assumed that the reference value of the target clock TGT_CLK is A and the value of the target clock TGT_CLK measured at time t is B. In this case, the value of the first seed value SEED_1 described in FIG. 7 may be determined as a difference between the two values, that is, a function value determined according to B-A.

In FIG. 8, only the amount of change of value of the target clock TGT_CLK at time t compared to the reference value of the target clock TGT_CLK may be considered, but after measuring the amount of change compared to the reference value of the target clock TGT_CLK at a plurality of times, the first seed value SEED_1 value may also be determined based on the measured total amount of change of value of the target clock TGT_CLK (e.g., an average of the total amount of change).

Thus, the operation of the memory system 100 to generate the logical block address value corresponding to the first generated command among the plurality of test commands CMD has been described.

Hereinafter, an operation in which the memory system 100 generates the logical block address value corresponding to the remaining test commands other than the first test command among the plurality of test commands CMD will be described.

Figure 9:
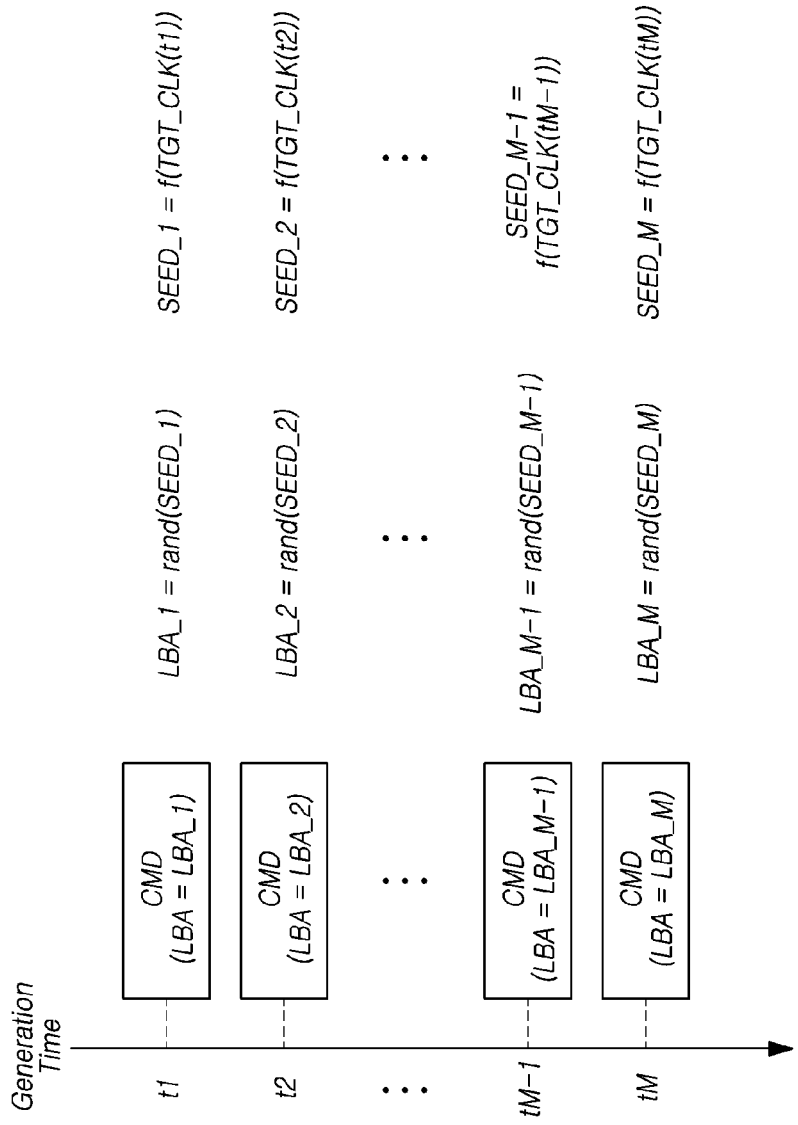
FIG. 9 is a diagram that illustrates an example of an operation in which the memory system generates the logical block address value corresponding to the test command, other than the first generated test command, among the test commands of FIG. 6.

FIG. 9 is a diagram that illustrates an example of an operation in which the memory system 100 generates the logical block address value corresponding to the test command other than the first test command among the test commands CMD of FIG. 6.

Referring to FIG. 9, the memory controller 120 of the memory system 100 may randomly generate the logical block address corresponding to the remaining test commands based on the target clock TGT_CLK, similar to the test command initially generated among the plurality of test commands CMD.

As illustrated in FIG. 9, the memory controller 120 may randomly generate the first logical address LBA_1, which is a logical address corresponding to the first generated test command among the plurality of the test commands CMD, based on the first seed SEED_1, which is a seed determined based on the value of the target clock TGT_CLK at a time t1 when the corresponding command is generated.

In addition, the memory controller 120 may randomly generate the second logical address LBA_2, which is a logical address corresponding to the second generated test command among the plurality of the test commands CMD, based on the second seed SEED_2, which is a seed determined based on the value of the target clock TGT_CLK at a time t2 when the corresponding command is generated.

In a similar manner, the memory controller 120 may randomly generate the (M−1)th logical address LBA_M−1, which is a logical address corresponding to the (M−1)th test command among the plurality of the test commands CMD, based on the (M−1)th seed SEED_M−1, which is a seed determined based on the value of the target clock TGT_CLK at a time tM−1 when the corresponding command is generated. In addition, the memory controller 120 may randomly generate the Mth logical address LBA_M, which is a logical address corresponding to the Mth test command among the plurality of the test commands CMD, based on the Mth seed SEED_M, which is a seed determined based on the value of the target clock TGT_CLK at a time tM when the corresponding command is generated.

Figure 10:
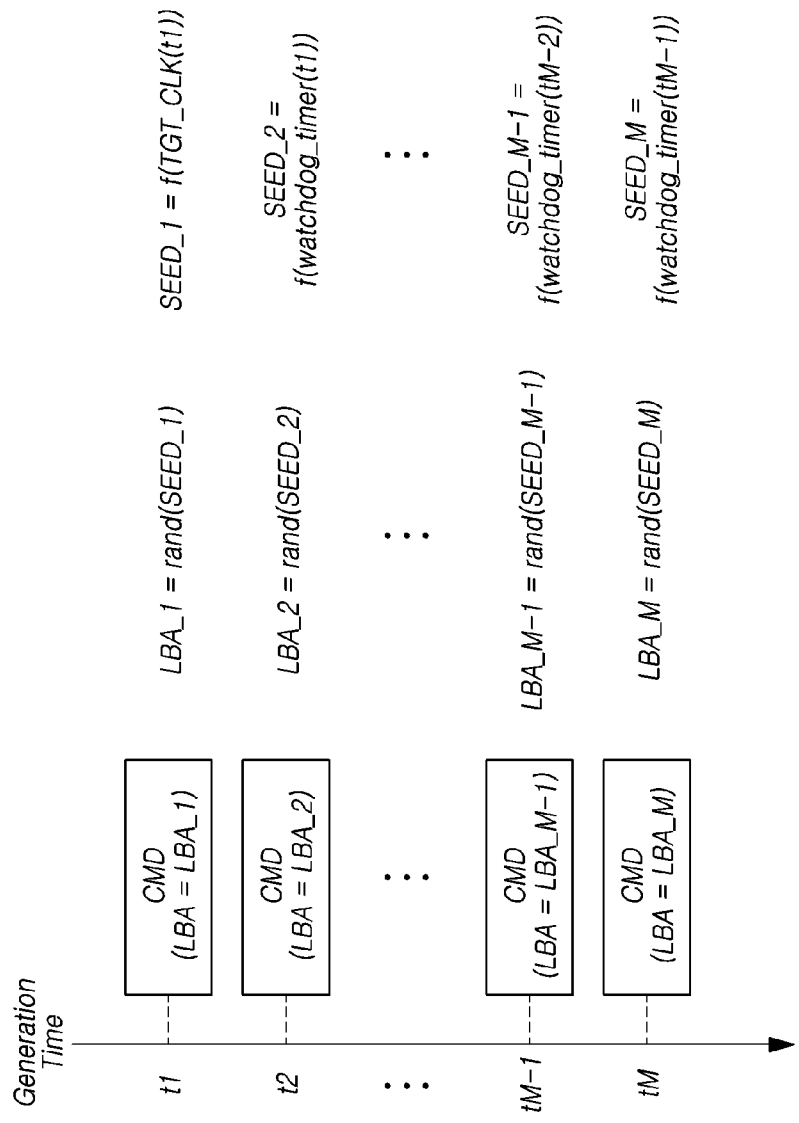
FIG. 10 is a diagram that illustrates another example of an operation of the memory system generating the logical block address value corresponding to a command, other than the first generated command, among the test commands of FIG. 6.

FIG. 10 is a diagram that illustrates another example of an operation of the memory system 100 generating the logical block address value corresponding to a command other than the first generated command among the test commands CMD of FIG. 6.

Referring to FIG. 10, the memory controller 120 may randomly generate the first logical address LBA_1, which is a logical address corresponding to the first generated test command among the plurality of the test commands CMD, based on the first seed SEED_1, which is a seed determined based on the value of the target clock TGT_CLK at a time t1 when the corresponding command is generated.

Thereafter, the memory controller 120 may randomly generate the second logical address LBA_2, which is a logical address corresponding to the second generated test command among the plurality of the test commands CMD, based on the second seed SEED_2, which is a seed determined based on the value of the watchdog timer at the time t1 when the first command among the plurality of test commands CMD is generated.

The watchdog timer may be initialized at or for every specific time interval (e.g., 10 seconds), and the value of the watchdog timer may decrease over time from the initialization time until it is initialized again. Accordingly, the memory controller 120 may, at a time t1, determine the second seed SEED_2 based on a value (e.g., 887654321 ns) that has decreased from the time when the watchdog timer is initialized, and may generate the second logical block address LBA_2 based on the second seed SEED_2.

In a similar manner, the memory controller 120 may randomly generate the (M−1)th logical address LBA_M−1, which is a logical address corresponding to the (M−1)th test command among the plurality of the test commands CMD, based on the (M−1)th seed SEED_M−1, which is a seed determined based on the value of the watchdog timer at the time tM−2 when the (M−2)th command among the plurality of test commands CMD is generated. In addition, the memory controller 120 may randomly generate the Mth logical address LBA_M, which is a logical address corresponding to the Mth test command among the plurality of the test commands CMD, based on the Mth seed SEED_M, which is a seed determined based on the value of the watchdog timer at the time tM−1 when the (M−1)th command among the plurality of test commands CMD is generated.

Thus, in general, the memory controller 120 may determine the logical block address value corresponding to the command generated as the Nth (where N is a natural number of 2 or more) among the plurality of test commands CMD, based on the value of the watchdog timer at the time when the (N−1)th test command (a command generated immediately before the corresponding command) is generated among the plurality of test commands CMD.

Thus, a method in which the memory system 100 randomly generates the logical block address corresponding to each of the plurality of test commands CMD has been described.

Hereinafter, an operation in which the memory system 100 determines the priority of processing the plurality of test commands CMD will be described.

In some cases, the memory controller 120 of the memory system 100 may process a plurality of test commands CMD according to the generated order of the test commands. However, in other cases, the memory controller 120 of the memory system 100 may process the plurality of test commands based on a priority policy corresponding to or associated with the target firmware TGT_FW.

The priority policy corresponding to the target firmware TGT_FW may be stored, for example, in the target firmware TGT_FW. When testing the target firmware TGT_FW, the memory controller 120 may check the priority policy corresponding to the target firmware TGT_FW based on information stored in the designated area of the target firmware TGT_FW.

Alternatively, the memory controller 120 may check the priority policy corresponding to the target firmware TGT_FW based on the unique information (e.g., version information) for the target firmware TGT_FW. For example, the memory controller 120 may determine that different priority policies are applicable, according to whether the version of the target firmware TGT_FW is equal to or greater than a specific value.

The memory controller 120 may determine the priority of processing the plurality of test commands CMD according to the priority policy corresponding to the target firmware TGT_FW. In this case, the test command having a high priority may be processed first even if the generated time for the test command is later than other test commands.

In this case, when testing the target firmware TGT_FW, the memory controller may consider not only whether each of the plurality of test commands CMD is normally executed, but also whether the plurality of test commands CMD are processed according to the priority policy. For example, when a test command having a low priority is processed before a test command having a high priority, the memory controller 120 may determine that the test for the target firmware TGT_FW has failed, even though each test command is normally executed.

Figure 11:
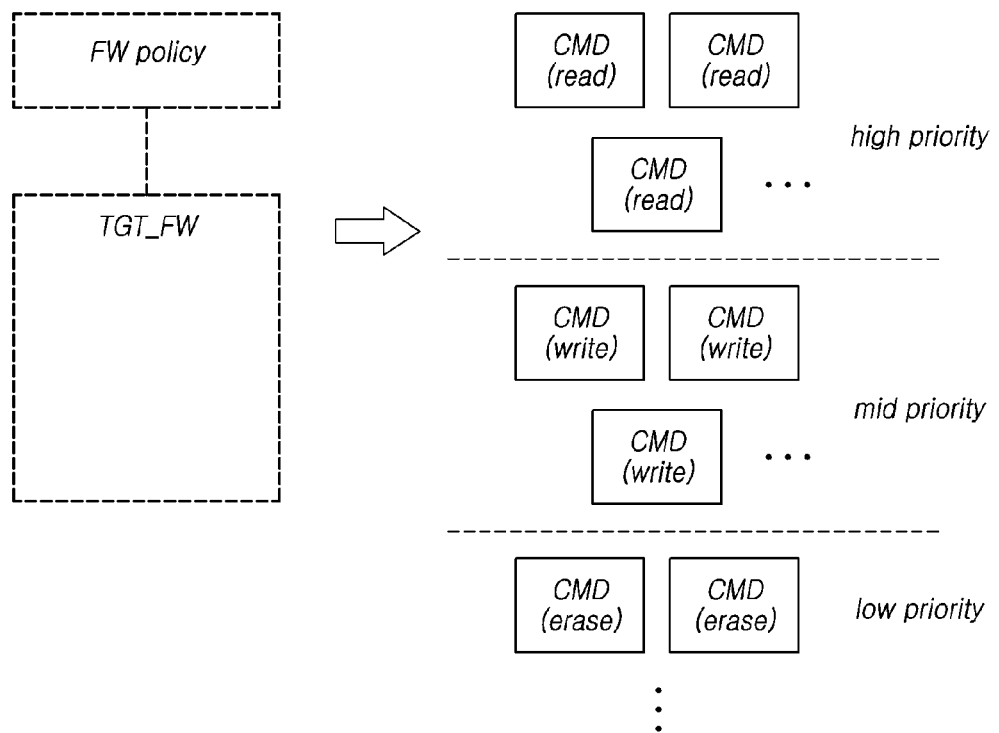
FIG. 11 is a diagram that illustrates an example of an operation of determining the priority of processing the plurality of test commands by the memory system according to embodiments of the present disclosure.

FIG. 11 is a diagram that illustrates an example of an operation of determining the priority of processing the plurality of test commands CMD by the memory system 100 according to embodiments of the present disclosure.

Referring to FIG. 11, the memory controller 120 of the memory system 100 may process the read command with a higher priority than the write command among the plurality of test commands CMD and may process the write command with a higher priority than the erase command.

That is, the memory controller 120 may first process the read command among the plurality of test commands CMD, then process the write command, and finally process the erase command.

In this case, the memory controller 120 may randomly determine that each of the plurality of test commands CMD will be at least one of the read command/write command/erase command.

For example, the memory controller 120 may generate a random value for each of the plurality of test commands CMD, and then may determine the corresponding command will be one of the read command/write command/erase command based on the result of performing a modular operation on the value.

For example, the memory controller 120 may generate the random value for each of the plurality of test commands CMD and then execute the modular operation that calculates the remainder by dividing the value by 3. If the result of the operation is 0, the memory controller 120 may determine the corresponding test command as the read command, if the result of the operation is 1, the memory controller 120 may determine the corresponding test command as the write command, and if the result of the operation is 2, the memory controller 120 may determine the corresponding test command as the erase command.

Figure 12:
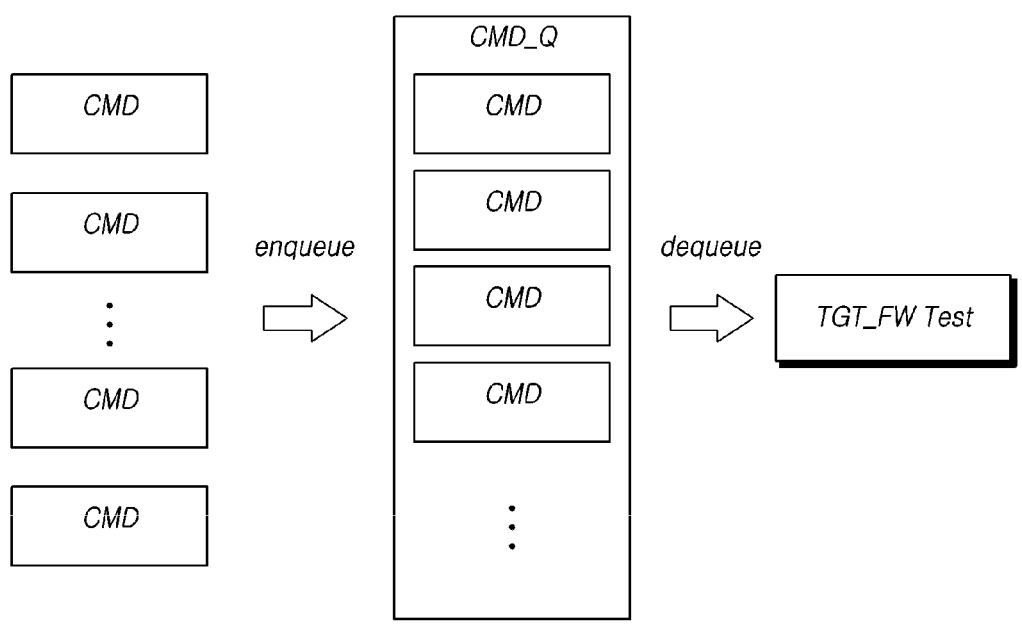
FIG. 12 is a diagram that illustrates an operation of inputting the plurality of test commands to a command queue by the memory system according to embodiments of the present disclosure.

FIG. 12 is a diagram that illustrates an operation of inputting the plurality of test commands CMD to a command queue CMD_Q by the memory system 100 according to embodiments of the present disclosure.

Referring to FIG. 12, the memory controller 120 of the memory system 100 may enqueue a plurality of test commands CMD to the command queue CMD_Q, dequeue the test command from the command queue CMD_Q to perform the dequeued test command and test the target firmware TGT_FW by processing the dequeued test command. When the number of passed test commands among test commands enqueued in the command queue CMD_Q is greater than or equal to a set threshold number or value, the memory controller 120 may determine that the test for the target firmware TGT_FW has succeeded.

In this case, the memory controller 120 may randomly set the order in which the plurality of test commands CMD are enqueued to the command queue CMD_Q, so that the target firmware TGT_FW can be tested in an environment similar to the actual user environment as closely as possible.

On the other hand, in other cases unlike in FIG. 12, the memory controller 120 may generate a specific number (e.g., 10000) of test commands, instead of using a queue, and may perform the test for the target firmware TGT_FW by checking the processing order of the generated test commands and the processing results (success/failure) of each test command.

Figure 13:
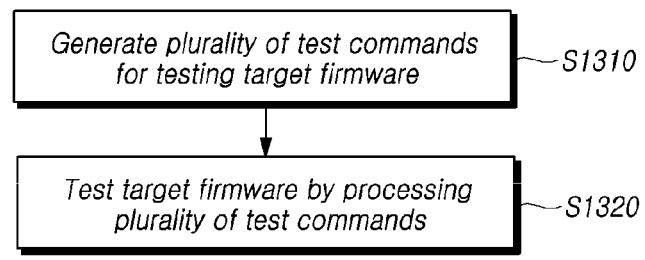
FIG. 13 is a diagram that illustrates a method of operating the memory system according to embodiments of the present disclosure.

FIG. 13 is a diagram that illustrates a method of operating the memory system 100 according to embodiments of the present disclosure.

Referring to FIG. 13, the operating method of the memory system 100 may include the step S1310 of generating the plurality of test commands CMD to test the target firmware TGT_FW when the firmware for controlling the memory device 110 is set as the target firmware TGT_FW.

In addition, the operating method of the memory system 100 may include the step S1320 of testing the target firmware TGT_FW by processing the plurality of test commands CMD generated in step S1310.

In this case, the value of the logical block address corresponding to each of the plurality of test commands CMD may be randomly generated based on the seed value corresponding to each of the plurality of test commands.

Among the plurality of test commands CMD, the logical block address value corresponding to the first generated test command may be randomly generated based on the target clock TGT_CLK. In this case, the target clock TGT_CLK may be, for example, a system clock or a clock used for synchronization in a data transmission/reception process with the memory device.

Among the plurality of test commands CMD, the logical block address value corresponding to the remaining test commands excluding the first generated test command may be determined as follows.

As an example, the logical block address value corresponding to the test command generated as the Nth (where N is a natural number of 2 or more) among the plurality of test commands CMD may be randomly generated based on a target clock.

As another example, the logical block address value corresponding to the test command generated as the Nth (where N is a natural number of 2 or more) among the plurality of test commands CMD may be generated based on the value of the watchdog timer at the time when the (N−1)th test command among the plurality of test commands CMD is generated.

The priority of processing the plurality of test commands CMD may be determined according to the priority policy corresponding to the target firmware.

Meanwhile, in step S1320, when testing the target firmware TGT_FW, after enqueuing the plurality of test commands CMD to the command queue CMD_Q, the target firmware TGT_FW can be tested by processing the plurality of test command enqueued in CMD_Q.

Further, the operation of the memory controller 120 described herein may be controlled by the control circuit 123, and the processor 124 may execute or drive the firmware in which all operations of the memory controller 120 are programmed.

Figure 14:
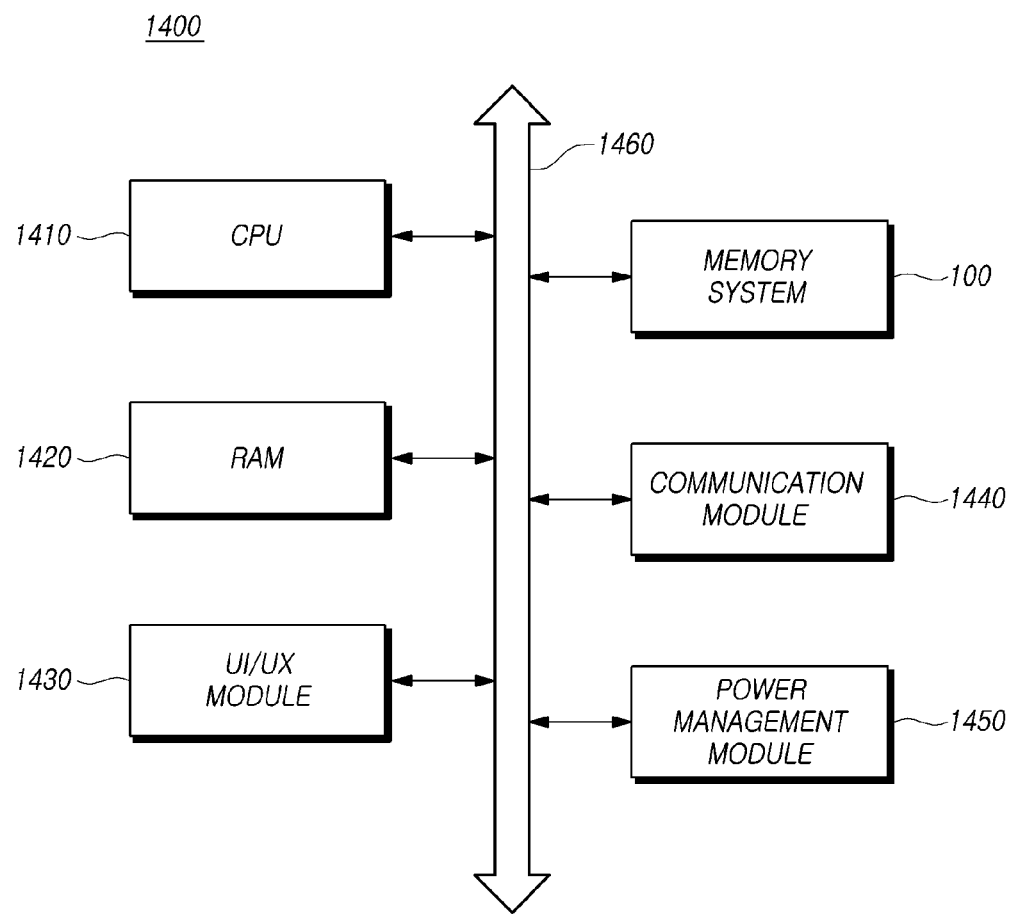
FIG. 14 is a diagram that illustrates the configuration of a computing system according to embodiments of the present disclosure.

FIG. 14 is a diagram that illustrates the configuration of a computing system 1400 according to embodiments of the present disclosure.

Referring to FIG. 14, the computing system 1400 according to an embodiment of the present disclosure may include:

a memory system 100 electrically connected to a system bus 1460; a CPU 1410 configured to control the overall operation of the computing system 1400; a RAM 1420 configured to store data and information related to operations of the computing system 1400; a user interface/user experience (UI/UX) module 1430 configured to provide the user with a user environment; a communication module 1440 configured to communicate with an external device as a wired and/or wireless type; and a power management module 1450 configured to manage power used by the computing system 1400.

The computing system 1400 may be a personal computer (PC) or may include a mobile terminal such as a smartphone, a tablet or various electronic devices.

The computing system 1400 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

According to embodiments of the present disclosure described herein, the operation delay time of the memory system may be minimized or reduced. In addition, according to an embodiment of the present disclosure, an overhead occurring in the process of calling a specific function may be minimized or reduced. Although various embodiments of the present disclosure have been described for illustrative purposes, those skilled in the art will appreciate that various modifications, additions and substitutions are possible, without departing from the scope and spirit of the disclosure as disclosed in the accompanying claims. Therefore, embodiments of the present disclosure have been described for the sake of brevity and clarity. The scope of the present disclosure shall be construed on the basis of the accompanying claims in such a manner that all of the technical ideas included within the scope equivalent to the claims belong to the present disclosure.

What is claimed is:

1. A method of operating a memory system, including a memory device, the method comprising:
    generating, when a firmware for controlling the memory device is set as a target firmware, a plurality of test commands to test the target firmware; and
    testing the target firmware by processing the plurality of test commands,
    wherein a logical block address value corresponding to each of the plurality of test commands is randomly generated based on a seed value corresponding to each of the plurality of test commands,
    wherein the logical block address value corresponding to a first generated test command among the plurality of test commands is randomly generated based on a target clock of the memory device, and
    wherein the logical block address value corresponding to a test command generated as an Nth test command among the plurality of test commands is randomly generated by using a value of a watchdog timer at a time when an (N−1)th test command among the plurality of test commands is generated, where N is a natural number of 2 or more.

2. The method of claim 1, wherein the target clock is a system clock or a clock used for synchronization in a data transmission/reception process with the memory device.

3. The method of claim 1, wherein the logical block address value corresponding to the test command generated as the Nth test command among the plurality of test commands is randomly generated based on the target clock, where N is a natural number of 2 or more.

4. The method of claim 1, wherein a priority of processing the plurality of test commands is determined based on a priority policy corresponding to the target firmware.

5. The method of claim 4, wherein a processing priority of a read command is higher than a processing priority of a write command, and the processing priority of the write command is higher than a processing priority of an erase command among the plurality of test commands.

6. The method of claim 1, wherein the testing of the target firmware includes:
    enqueuing the plurality of test commands to a command queue; and
    processing the plurality of test commands enqueued to the command queue to test the target firmware.

7. A memory system comprising:
    a memory device; and
    a memory controller for communicating with the memory device and executing a firmware to control the memory device,
    wherein the memory controller:
        generates, when the firmware is set to a target firmware, a plurality of test commands to test the target firmware,
        tests the target firmware by processing the plurality of test commands,
        randomly generates a logical block address value corresponding to each of the plurality of test commands based on a seed value corresponding to each of the plurality of test commands,
        randomly generates the logical block address value corresponding to a first generated test command among the plurality of test commands based on a target clock, and
        randomly generates the logical block address value corresponding to a test command generated as an Nth test command among the plurality of test commands based on a value of a watchdog timer at a time when an (N−1)th test command among the plurality of test commands is generated, where N is a natural number of 2 or more.

8. The memory system of claim 7, wherein the target clock is a system clock or a clock used for synchronization in a data transmission/reception process with the memory device.

9. The memory system of claim 7, wherein the memory controller randomly generates the logical block address value corresponding to the test command generated as the Nth test command among the plurality of test commands based on the target clock, where N is a natural number of 2 or more.

10. The memory system of claim 7, wherein the memory controller determines a priority of processing the plurality of test commands based on a priority policy corresponding to the target firmware.

11. The memory system of claim 10, wherein the memory controller processes a read command with a higher priority than a write command and processes the write command with a higher priority than an erase command among the plurality of test commands.

12. The memory system of claim 7, wherein the memory controller:
- enqueues the plurality of test commands to a command queue; and
- processes the plurality of test commands enqueued to the command queue to test the target firmware.

* * * * *